United States Patent Office 3,449,760
Patented June 10, 1969

3,449,760
EXTRACTION OF SAPOGENINS FROM
VEGETABLE MATERIALS
Roland Hardman, Beeston, England, assignor to National Research Development Corporation, London, England
No Drawing. Filed Oct. 18, 1966, Ser. No. 587,432
Claims priority, application Great Britain, Oct. 22, 1965, 44,939/65
Int. Cl. C07c *173/06, 167/40*
U.S. Cl. 260—239.55                    11 Claims

ABSTRACT OF THE DISCLOSURE

In the extraction of saponins and sapogenins from vegetable materials with a solvent, improved yields are obtained if the material, instead of being comminuted, is treated in uncomminated form and has a particle size not smalled than a No. 30 sieve, British Standard 410.

---

This invention relates to the extraction of steroidal saponins and sapogenins from vegetable materials.

Sapogenin affording vegetable materials are grown in various parts of the world and the sapogenins which can be recovered from them are of considerable commercial significance as they can be used as a starting material for the manufacture of various biologically active steroid compounds, particularly corticosteroids. The sapogenins normally occur in the plant in the form of saponins in relatively small amounts e.g. about 2½ and much study has been given to the problem of efficient extraction.

The particular vegetable materials with which the present process is concerned are sapogenin-affording seeds, for example those in the Leguminosae, Balanitaceae and Zygophyllaceae families and particularly seeds derived from the genera Trigonella, Trifolium and Balanites. Several processes for the extraction of sapogenins from such materials have been proposed in the past and all have involved the extraction of the saponins from the vegetable material with a solvent as a first step followed by the hydrolysis of the glycosidic link in the extracted saponin to give the sapogenin.

In the extraction of saponins and sapogenins from the seeds and other vegetable materials it has always been thought essential to powder finely grind or comminute the vegetable material as much as possible so as to break down the cellular structure as much as possible as this was believed to permit improved access of the extracting solvent or hydrolytic agent to the steroidal compounds.

It has now been found that so far as extraction from seeds is concerned there are advantages to be gained by avoiding breaking down the cellular structure. In the first place it has been found, most surprisingly that the overall yield of sapogenins recovered can be increased when the seed is treated in an uncomminuted form and furthermore that the handling problem is simplified particularly in the filtration, washing, and extraction steps.

Accordingly the present invention provides a process for extracting steroidal saponins or sapogenins from steroidal sapogenin-affording seeds which comprises treating the seed in an uncomminuted form either with a saponin solvent to give a solution of saponin or with a substance capable of hydrolysing glycosidic linkages to give a hydrolysate containing sapogenin.

The seed to be subjected to the process of the present invention may be treated in the form of whole seed or whole embryo (germ) or broken seed or broken embryo depending on the size of the whole seed. Thus small seeds, e.g. up to about 5 mm. in largest diameter, can conveniently be treated without breaking at all but in the case of larger seeds, it is often preferable to break the seed to give smaller pieces. The reduction of the seed material to a powder should of course, be avoided and the bulk of the uncomminuted seed will normally be retained by a No. 30 sieve, British Standard 410 (B.S. 410).

It is possible to break the sapogenin-affording seeds to give on the one hand embryo and on the other hand seed coats and other layers and particularly good results have been obtained if these coats and layers are partially or completely separated from the embryo and the embryo in a whole or broken form subjected to the extraction process.

The sapogenin-affording seed may be mature seed which can be viable or non-viable or may be immature seed which still has a useful saponin or sapogenin content.

In cases where the seed has a useful oil content the fixed and volatile oil may first be removed, by a process which does not involve comminution of the seed, e.g. by crushing and the defatted seed then subjected to the present sapogenin recovery process. This step is important in the case of a large seed containing a high proportion of oil, e.g. Balanites, and the crushing can serve both to facilitate removal of the oil and to break the seed to a form suitable for use in the persent process.

This invention is particularly concerned with the recovery of sapogenins such as diosgenin and its epimer yamogenin from sapogenin-affording seeds. The preferred seeds for extraction by the present process are those derived from *Trigonella foenumgraecum* (fenugreek) which is grown as a normal cash drop in many parts of the world including countries bordering the Mediterranean Sea, other North African territories, Portugal, India, Pakistan, and Russia. Other seeds from which sapogenins may be extracted by the present process include *Trigonella coerulea, T. corniculata, T. cretica, T. hamosa, T. platycarpus, T. radiata, trafolium ornithopodioides* and *Balanites aegypatiaca* and *B. Wilsoniana.* The total sapogenin contents of these seeds is usually between 1–2% on a moisture free basis depending on the source.

It has also been found that the overall yield of steroidal sapogenins can be increased if the seed is incubated for a period of time before being subjected to the extraction process. This incubation takes the form of maintaining the seed material at a selected temperature in the presence of an added aqueous medium. The temperature should be selected so as to encourage the biological changes in the vegetable material which enhance the overall yield of sapogenin-yielding material. For example, in the case of seeds the selected temperature, which may be from about 5° C. up to about 40° C. or even 80° C., will depend on whether the germination of the seed is to be encouraged or discouraged. When the seed material is incubated with added water the amount of water may be sufficiently limited so that it is all absorbed by the seed material and there is no separate aqueous phase present. Alternatively a larger amount of water may be added to provide a separate aqueous phase during and at the end of the incubation period. In the case of fenugreek it is desirable to use at least 5 parts by weight of water per part by weight of seed but this ratio can be increased to 10:1 or even 20:1. In this situation sapogenins may be recovered from the water soluble sapogenin-affording materials in the aqueous phase. It is believed that pretreatment of the seed in this way either encourages the additional formation of sapogenin-affording material by synthesis or due to release of existing sapogenins in the seed or both processes may be involved. It is found that when the seeds are incubated in this way the overall yield of sapogenins may be influenced by the presence of light or darkness or the presence or absence of additional aeration during the incubation period. The addition of mineral supplements to the aqueous media may also be desirable. In general it is found that the overall yield of sapogenins can be increased by incubation techniques by up to as much as 100% according to the age and source of the seed and the particular method in incubation.

The overall yield of sapogenins recovered may also be increased if the incubation and/or hydrolysis is carried out in the presence of squalane, (2,6,10,15,19,23-hexamethyltetracosane) or other steroid percursor on the saponin biosynthetic pathway.

Squalane may be added as such, for example as a purified chromatographic grade chemical or may be added in the form of crude animal or vegetable material which contains squalane. For example, liver, bacteria, fungi, such as yeast, potatoes, seeds, fruits and leaves of species of Bisum, Trigonella, Trifolium etc.; ground nut oil; and olive oil all contain available squalane and a quantity of these calculated to provide the desired amount of squalane, may be used in place of the chemical itself. A further possibility is to use a steroid precursor i.e. a simpler chemical compound which can be taken up into the biosynthetic chain in the plant material and be converted to the saponin or sapogenin by the cells of the vegetable material. Such precursors include squalane (2,6,10,15,19,23-hexamethyltetracosane-2,6,10,14,18,22-hexane), mevalonic acid; 3-methyl-but-3-enol; and geraniol; or their derivatives such as pyrophosphates. Other related compounds in the biosynthetic pathway may be used alone or as mixtures with one another or with squalane. Again the added material e.g. geraniol need not be added as a pure chemical but can be added as a crude natural or synthetic product, e.g. geranium oil (palmarosa oil) or can even be added in the form of vegetable materials yielding geraniol. The $C_{10}$ and higher molecular weight additives may also act to control microorganisms present which might adversely affect the process. Isotopically labelled squalane or other precursor e.g. labelled with $C^{14}$ or tritium may be used to give isotopically labelled saponins and sapogenins. Enzymes participating in the biosynthesis of squalane and steroids may also be added. These may take the form of the squalane containing animal or plant tissue already mentioned or of cell free extracts from these tissues or of isolated enzymes.

The amount of squalane (or squalane source or other precursor) to be added to the seed material depends on several variables, e.g. the nature and condition of the seed material and the pretreatment and extraction conditions but since residual squalane can readily be recovered from the sapogenin product, the use of an amount in excess of requirements is not necessarily uneconomic. It has been found that very useful results can be obtained using up to about 50% by weight of squalane based on the dry weight of the seed material.

As an additional or alternative pretreatment the seed material may be incubated with degrading enzymes such as cellulase or pectinase. This is believed to assist in bringing the squalane or other precursor and later the hydrolysing agent into contact with the cells. When enzyme pretreatment is adopted, enzyme pretreatment and the incubation mentioned above may be carried out simultaneously and squalane may be introduced at any stage in the incubation period.

Th steroidal compounds may be recovered from the uncommitted seed which may have been subjected to incubation and/or squalane etc., pretreatment, by extracting the seed material with a saponin solvent to give a solution of saponin from which the saponin may be recovered for further treatment or which may be hydrolysed to give a hydrolysate from which the sapogenins may be recovered. This extraction has been generally superseded however and the process of the present invention is preferably used in association with the newer extraction method in which the seed is subjected to hydrolysis conditions so that the glycosidic linkage in the saponin is broken to give a hydrolysate containing sapogenin which may then be extracted with a sapogenin solvent.

The conversion of the sapogenin affording materials, to sapogenins can be carried out by treatment with a mineral acid to hydrolyse the glycosidic linkages. One convenient way of effecting this conversion involves heating e.g. up to reflux temperature with 2 N hydrochloric acid for up to about 5 hours. Other non-oxidising mineral acids such as sulphuric acid are suitable however and other acidic materials such as acid salts may also be used. The sapogenins may be readily extracted from the acid insoluble fraction of the hydrolysate by extraction with a sapogenin solvent such as a hydrocarbon.

A preferred procedure according to the invention includes incubating uncomminuted seeds of *T. foenumgraecum* at up to 40° C. for up to seven days with added water heating the incubated product with a diluted hydrochloric acid and recovering diosgenin from the acid free acid-insoluble material by extraction with an organic solvent such as light-petroleum. In this case saponins, which are water soluble, may be found in the aqueous phase at the end of the incubation but the sapogenins formed on hydrolysis are insoluble in the aqueous acid and can be filtered off together with the treated seeds prior to the solvent extraction.

The following examples are given to illustrate the invention. In these examples the term "diosgenin" includes diosgenin alone or together with its epimer yamogenin while "yamogenin" refers to this epimer only.

EXAMPLE 1

1.1 kg. of a sample of whole Moroccan fenugreek seeds having a moisture content of 10% and a sapogenin content by infra-red assay of 1.16% on a moisture free basis (m.f.b.) is incubated with 4 l. of tap water at 37° C. for 2 days. 775 ml. concentrated hydrochloric acid is then added to make approximately 2 N with acid and the mixture boiled under reflux for 2 hours and cooled. The insoluble matter is collected at the pump and washed with 750 ml. water, then with dilute solution of ammonia until the cake is alkaline (approximately 500 ml. of 10% solution of ammonia is used). The filter cake is dried in a stream of air at 80° C. for 6 hours, then broken up and the drying continued for a further 6 hours. The dried material (weight 400 g.) was coarsely powdered, put into a percolator—a glass tube of length 62 cm. and diameter 5.1 cm.—and macerated with light-petroleum, B.P. 40–60° C., for ½ hour and then percolated with the solvent for 15 minutes. Afterwards, the maceration period is increased to 1 hour followed by percolation for 15 minutes and this one hour and 15 minutes process repeated a second time. The bulked percolate (450 ml.) shows no crystals but on concentration yields crude diosgenin 2.05 g., yield 0.21% m.f.b. (Fraction A) [M.P. 190–192° C. shown to be mainly diosgenin by T.L.C.] (thin layer chromatography). Recovery of the solvent from the mother liquor from Fraction A produced oil, 39 g., yield 3.9% m.f.b.

The marc remaining after percolation with light-petroleum, B.P. 40–60° C., is extracted with this solvent in a soxhlet apparatus for 4 hours. (The preliminary percolation with the solvent removes sufficient oil to prevent bumping in the flask containing the boiling solvent feeding the soxhlet.) Removal of the solvent (1 l.) gives a paste (10 g.) which is refluxed with light-petroleum, B.P. 100–120° C., 100 ml. The hot solution is filtered to remove a trace of insoluble matter and the filtrate afforded in two crops, crude disogenin 3.13 g., yield 0.31% m.f.b. (Fraction B) (M.P. 190–193° C. shown to be mainly disogenin by T.L.C.). Total yield of crude diosgenin, Fraction $A+B$:5.18 g., 0.52% m.f.b. M. Liquor from Fraction B produces oil, 36 g., yield 3.6% m.f.b. on recovery of the solvent.

The extraction with light-petroleum, B.P. 40–60° C., in the soxhlet is now continued for a further period of 18 hours. Needles separated from the solvent (1 l.) without prior concentration of the solution: Fraction C: crude gitogenin, 0.28 g., yield 0.03% m.f.b. (M.P. 244–248° C., gitogenin confirmed by T.L.C.). The mother liquor evaporates to dryness, gives solid residue Fraction D: crude gitogenin 0.23 g., yield 0.02% m.f.b. (M.P. 235–239° C.; by T.L.C. a mixture of gitogenin and disogenin).

Summary:
Diosgenin 5.2 g., 0.52% m.f.b.
Gitogenin 0.5 g., 0.05 m.f.b.
Oil 75 g., 7.5% m.f.b.

EXAMPLE 2

The Moroccan whole fenugreek seed used for Example 1 is milled and this broken seed, in the form of broken embryo admixed with 45% of its weight of non-embryo fragments, is used after storage at 20–22° C., for from 16 to 72 hours—during which time various milling and separation procedures produced the material in several small lots. This material, 660 g. all of which passes through a No. 10 sieve, 95% of which is retained by a No. 20 sieve and all of which is retained by a No. 30 sieve (B.S. 410) (infrared assay: total sapogenin 1.68% m.f.b.) equivalent to 310 g. broken embryo, free of non-embryo fragments and moisture, is incubated in two closed trays, each of length 30.5 cm., width 23 cm. and depth 5 cm., with a total volume of 2.1 of tap water at 37° C., for 3 days. Almost all the water is taken up by the material. With the aid of 500 ml. water the material is transferred to a suitable flask, 550 ml. concentrated hydrochloric acid added and the mixture is boiled under reflux for 2 hrs. The extraction is continued as in Example 1 yielding:

Diosgenin 2.85 g. (in 4 crops) (0.48% m.f.b., broken seed).
Oil 62.1 g. (9.4% m.f.b., broken seed).

EXAMPLE 3

(a) 110 g. of a further batch of whole Moroccan fenugreek seed having an assayed moisture content of 10% and a total sapogenin content of 1.50% m.f.b. is boiled under reflux with 500 ml. of 2 N hydrochloric acid for 2 hours and cooled. The acid-insoluble residue is collected at the pump and freed from acid by washing with four successive volumes of tap water using 100 ml. each time, then with 80 ml. of 10% solution of ammonia and finally with another 100 ml. of tap water. The cake is dried at 80° C. for 6 hours in the hot air drying oven, powdered (weight 28.6 g.), and macerated in a soxhlet thimble for 1 hour with cold light-petroleum (B.P. 40–60° C.) and allowed to drain. Removal of the solvent produces oil=6.5 g. (yield=6.5%). No sapogenin separated by concentration of, or brief chilling of the oil at 5° C. Thin layer chromatography shows a low concentration of diosgenin in the oil.

The marc remaining after maceration with cold light-petroleum is (B.P. 40–60° C.) for 6 hours. Recovery of the solvent gives a crystalline material which after dissolving in light-petroleum (B.P. 100–120° C.) under reflux and cooling, affords crude diosgenin=0.41 g. (yield 0.41% m.f.b.) M.P.=193–195° C. Similarly, continuation of the soxhlet extraction of the marc for a period of 24 hours produces crude gitogenin=0.08 g. (0.08% m.f.b.).

(b) By way of comparison 110 g. of the same sample of fenugreek as described in Example 3 (a) is incubated with 500 ml. of tap water at 37° C. for 6 hours and 105 ml. of concentrated hydrochloric acid is then added. The mixture is boiled under reflux for 2 hours and the process is then completed as described in (a) above with the following yields:

Oil obtained after maceration for 1 hour=5.7 g. (5.7% m.f.b.)
Crude diosgenin, after extraction for 6 hours=0.70 g. (0.70% m.f.b.) M.P.=191–194° C.

Diosgenin and gitogenin mixture obtained after extraction for another 12 hours=0.02 g. (0.02% m.f.b.), T.L.C.: Gitogenin+trace of diosgenin) M.P.=246–248° C. Gitogenin after extraction for further 24 hours=0.07 g. (0.07% m.f.b.) M.P.=245–247° C.

EXAMPLE 4

Fenugreek of West Pakistan origin is milled to separate the sapogenin-rich embryo from the mucilage layer and seed coat 20 g. of the embryo (all being retained by a No. 30 sieve B.S. 410) having an assayed total sapogenin content of 2.4% m.f.b. is partially defatted by extraction with light-petroleum, B.P. 40–60° C., in a soxhlet for 1 hour. Removal of the solvent from the extract produces 0.53 g. of an oil: (2.7% m.f.b.). By T.L.C. this oil is shown to be free of diosgenin. The marc from the thimble is dried at 65–70° C. and incubated with 60 ml. tap water for 3 days at 37° C. in a closed vessel. Afterwards the mixture is transferred to a flask with water washings and concentrated hydrochloric acid added so that the final volume is 150 ml. 2 N HCl. This is boiled under reflux for 2 hours and works up for diosgenin as in Example 3. Yield 0.20 g., 1.0% m.f.b. embryo.

EXAMPLE 5

A sample of fenugreek of Moroccan origin having a total sapogenin content of 1.70% is incubated at 37° C. with 20 times its weight of water for periods of time from 1 to 96 hours. Concentrated hydrochloric acid is then added to the mixture to provide a 2 N acid medium and the mixture refluxed for 2 hours. The dried acid free acid-insoluble material is extracted with light-petroleum B.P. 40–60° C. for 24 hours in a soxhlet to isolate the sapogenins. The following table shows the effect of increasing the incubation period on both powdered and unpowdered seeds.

TOTAL SAPOGENIN BY INFRA RED ASSAY: PERCENT, M.F.B. WHOLE SEED

| Time, hrs. | Unpowdered (whole seed) | Powdered |
|---|---|---|
| 1 | 1.66 | 1.32 |
| 6 | 1.92 | 1.26 |
| 12 | 1.72 | 1.34 |
| 18 | 1.57 | 1.26 |
| 24 | 1.60 | 1.41 |
| 30 | 1.61 | |
| 36 | 1.70 | |
| 42 | 1.70 | |
| 48 | 1.55 | 1.37 |
| 54 | 1.57 | |
| 60 | 1.57 | |
| 66 | 1.57 | |
| 72 | 1.66 | 1.24 |

EXAMPLE 6

Incubation of fenugreek with steroid precursor 50 ml. of tap water and 1 ml. squalane (2:6:10:15:19:23-hexamethyltetracosane) is added to 5 g. of whole fenugreek seed. The mixture is placed in 500 ml. conical flask plugged with cotton wool, and subjected to continuous light at approximately 240 lumens/sq. ft. at room temperature (20–23° C.) with continuous aeration by shaking to encourage germination. After 24 hours the radical shows an elongation of 2–3 mm. beyond the micropyle.

The incubated product is treated with hydrochloric acid, and the acid-insoluble material extracted as described in Example 5 and the product worked up to give the sapogenin and assayed by infra red analysis. The advantageous effect of incubating with squalane in this manner is shown in the table following Example 7 where the control experiments are carried out in exactly the same way but without using squalane.

EXAMPLE 7

Incubation of fenugreek with steroid precursor 50 ml. of tap water with 0.5 ml. squalane are added to 5 g. of whole fenugreek seed and the mixture incubated in darkness at 37° C. for 24 hours to discourage subsequent germination. A further 0.5 ml. squalane is then added and the mixture subjected to the light and shaking conditions as described in Example 6. No elongation of the radical was obvious even up to 96 hours aeration.

The incubated product is treated with hydrochloric acid, and the acid-insoluble material extracted as described in Example 5 and was assayed by infra red analysis. The advantageous effect of incubating with squalane in this manner is shown in the following table where the control experiments are carried out in exactly the same way but without using squalane.

| Example | Aeration time in hours at 20-23° C. (after 24 hours incubation at 37° C. in the case of Example 7) | Total sapogenin by I.R. analysis, percent m.f.b. | | Percent increase |
|---|---|---|---|---|
| | | Control without squalane | With squalane | |
| 6 | 6 | 1.75 | 1.99 | 14 |
| 6 | 12 | 1.77 | 2.03 | 15 |
| 6 | 24 | 1.75 | 2.01 | 15 |
| 7 | 48 | 1.39 | 1.77 | 27 |
| 7 | 72 | 1.43 | 1.77 | 24 |
| 7 | 96 | 1.61 | 1.92 | 19 |

EXAMPLE 8

1 ml. squalane is added to 5 g. whole Moroccan fenugreek seed and shaken by hand for 2 minutes. 50 ml. of tap water are then added and the mixture incubated in the dark at 37° C. for 6, 24 or 48 hours (procedure A). The components are mixed thoroughly by shaking mechanically for 15 minutes after the first 3 hours of the 6 hour incubation period and after the first 4 hours in the other two cases. These conditions discourage germination of the seed. The incubated product is treated with hydrochloric acid and sapogenins extracted from the acid-insoluble residue as described in Example 5. The sapogenins are assayed by infra red analysis. Further experiments are carried out in which the same volume of squalane is introduced after adjusting the mixture to 2 N with hydrochloric acid and before boiling under reflux for 2 hours (procedure B) or squalane is omitted altogether (procedure C). Total sapogenin assays are shown below as percent m.f.b.

| Incubation time, hours | Procedure A, percent | Procedure B, percent | Procedure C, percent |
|---|---|---|---|
| 6 | 2.75 | 2.32 | 1.90 |
| 24 | 2.55 | 2.17 | 1.86 |
| 48 | 2.42 | 2.04 | 1.79 |

EXAMPLE 9

The procedures A and B described in Example 8 are repeated using geraniol (technical grade) in place of squalane but the 15 minutes of mechanical shaking is omitted during the incubation period. Total sapogenin assays are shown below as percent m.f.b.

| Incubation time, hours | Geraniol, ml. | Procedure A, percent | Procedure B, percent |
|---|---|---|---|
| 24 | 1 | 2.4 | 2.10 |
| 24 | 2 | 2.8 | 1.96 |
| 72 | 2 | 1.70 | 1.99 |

EXAMPLE 10

Seeds from freshly cracked *Balanites aegyptiaca* nuts are crushed in mortar to give broken seed (80% of which is retained by a No. 30 sieve, B.S. 410) which is defatted with light-petroleum (B.P. 40–60° C.) for 1 hour in a soxhlet extractor at a rate of 20 siphons per hour. Solvent is removed from the defatted seed by heating at 50–75° C. in an air stream oven.

Procedure A.—5 g. of this defatted material is hand shaken with 100 mls. of sterile tap water for 1 minute, 1 ml. squalane added under aseptic conditions and the mixture hand shaken for one further minute. The mixture is then incubated at 37° C. in the dark for 6 hours and the incubated product hydrolysed with hydrochloric acid and the sapogenins extracted from the acid-insoluble residue as described in Example 5. The sapogenins are assayed by infra red analysis.

Procedure B.—Incubation is omitted in this procedure. 5 g. of the defatted material is hand shaken for one minute with 122 ml. 2 N hydrochloric acid, 1 ml. of squalane is added, the mixture hand shaken for a further minute and the hydrolysis and extraction procedure A above followed.

Procedures C and D.—Procedures B and A respectively, are followed, but no squalane is included in the mixture.

The infra red assay results are shown below as total sapogenin percent m.f.b.

Procedure: Percent
C No incubation, no squalane _____ 1.60
B No incubation, squalane present _____ 1.75
D Incubation, no squalane _____ 1.00
A Incubation, squalane present _____ 2.17

EXAMPLE 11

To give uniform material for this example and to reduce foreign matter and weed seeds whole commercial Moroccan fenugreek seed is shaken on sieves and the seed which passes through a No. 6 sieve but is retained by a No. 10 sieve, B.S. 410 is selected. The seed used still contains a small amount of weed seed.

Procedure A.—1 kg. seed is boiled for 2 hours under reflux with a mixture of 4 l. of tap water and 820 ml. concentrated hydrochloric acid in a 10 l. flask which is afterwards cooled to room temperature (18–20° C.) under a running tap. The mixture is filtered at the pump and washed with water, then 5% ammonia solution and drained well before being dried in a current of hot air at 70° C. overnight. The acid-insoluble matter (weight about 300 g.) is powdered in a Glen Creston hand-mill then lightly packed in a soxhlet thimble and macerated with cold light-petroleum (B.P. 40–60° C.) in the soxhlet. After 2 hours the soxhlet is tipped to allow the petroleum solution to syphon over to give Extract No. 1 (see below) and then the extraction continued with hot light-petroleum in the soxhlet continuously in the usual way for (a) 2 hours and (b) 24 hours, to afford Extracts No. 2 and 3 (see below). The initial cold maceration removes sufficient oil to prevent the flask bumping dangerously during the hot extraction periods. Extracts Nos. 1, 2 and 3 are worked up separately but by the same procedure: Some solvent is removed and on standing at room temperature (18–20° C.) the extracts give crude crystalline diosgenin. Total weight 4.77 g., 0.53% m.f.b., after washing with light-petroleum and acetone and drying at 70° C., M.P.=190–191° C. (Buchi M.P. apparatus). Oil 70 g. 8% m.f.b. is obtained by removal of solvent from the mother-liquors.

Procedure B.—Incubation with squalane for 24 hours. 1 kg. whole seed is added to 4 l. tap water in a 10 l. flask in an isomantle. 100 ml. squalane is added and the mixture is heated and mechanically stirred for fifteen minutes until its temperature is 37° C. when it is set aside in an incubator (in dark) at that temperature. After 4 hours the mixture is again mechanically stirred for 15 minutes while its temperature is maintained at 37° C. with the aid of the isomantle. The flask is then returned to the incubator for a further 20 hours. Afterwards 820 ml. concentrated hydrochloric acid is added and the mixture boiled under reflux for two hours. Subsequently the isolation of oil and diosgenin is completed as in procedure A. Yield of crude crystalline diosgenin 5.72 g., 0.64% m.f.b. almost colourless, M.P. 189–190° C. This yield is 20% better than that given by procedure A.

Procedure C.—Incubation without squalane for 24 hours.

Procedure B is followed but in the absence of squalane. Yield of crude crystalline diosgenin 5.25 g., 0.58% m.f.b. almost colourless, M.P. 189–190° C. This yield is 10% better than that given by procedure A.

EXAMPLE 12

$C^{14}$ labelled diosgenin by germination of seeds of *Balanites aegyptiaca* at 30° C.

(a) Sodium acetate—2—$C^{14}$.—Twenty whole fresh seeds (weight about 10 g., moisture content 6%) from freshly opened *Balanites aegyptiaca* are surface sterilised and distributed in pairs with aseptic precautions into ten sterile plugged 100 ml. wide-mouth conical flasks each containing 10 ml. of sterile solution of sodium acetate—2—$C^{14}$ of activity 2 µc. The flasks are set aside in an incubator (in the dark) at 30° C. for 7 days. At the end of this time 50% of the seeds have clearly germinated and show radicles of length 1 cm. or more. Afterwards all the seeds are collected together in a funnel and washed well with water before they are dried at 70° C. overnight. The dried material is crushed and defatted by extraction with light-petroleum (B.P. 40–60° C.) in a soxhlet for 24 hours (labelled fats, sterols and hydrocarbons removed) prior to acid hydrolysis with refluxing 2 N hydrochloric acid for 2 hours. The neutralised and dried acid-insoluble matter gives a crude sapogenin by extraction with light-petroleum (B.P. 40–60° C.) for 24 hours. After the removal of the solvent the residue is taken up in benzene:chloroform, 7:3, applied to an alumina column (15 g.) and the greenish-yellow band eluted with the solvent mixture to give diosgenin contaminated with a small percentage of sterol. The diosgenin is recrystallised to constant specific activity from acetone, isopropanol and ethanol. 0.106 g., 1.13% m.f.b. labelled diosgenin are recovered, having an activity of $2.4 \times 10^2$ counts per min. per mg.

(b) DL-Mevalonic acid—2—$C^{14}$.—The above procedure is repeated using a total of 36 µc. of the DL acid (18 µc. of the biologically active isomer) in aqueous solution as its sodium salt. As before 50% of the seedlings show a radicle of length 1 cm. or more at the end of the 7 days at 30° C. but a much higher incorporation into the crude sapogenin fraction and in the isolated diosgenin was achieved than with labelled acetate: 0.128 g., 1.36% m.f.b. labelled diosgenin is recovered having an activity of $6.0 \times 10^3$ counts per min. per mg.

EXAMPLE 13

$C^{14}$ labelled diosgenin by germination of fenugreek seeds at 25° C.

40 g., whole Moroccan fenugreek seed is surface sterilised and incubated for 7 days at 25° C. in a sterile solution of tap water containing 20 µc. of $C^{14}$ labelled DL mevalonic acid sodium salt (10 µc. of the biologically active isomer) while exposed to light (240 lumens per sq. ft.). After 7 days germation was substantially 100% and the labelled sapogenins recovered by a similar procedure to that used in Example 12:

Disogenin—0.25 g., 0.70% m.f.b., specific activity $2.98 \times 10^3$ counts per min. per mg.

Gitogenin of specific activity—$1.59 \times 10^3$ counts per min. per mg. is also recovered.

I claim:
1. In the process of extracting saponins and sapogenins from sapogenin-affording seeds and embryos with a solvent, the improvement which comprises extracting said seeds and embryos in an uncomminuted form, said seeds and embryos having a particle size essentially greater than a No. 30 sieve, British Standard 410.

2. The improvement according to claim 1 wherein said seeds are viable or non-viable mature seeds or immature seeds, and the seeds and embryos are whole or broken.

3. The improvement according to claim 2 wherein said seeds and embryos are crushed prior to extraction and defatted to remove fixed and volatile oils.

4. The improvement according to claim 1 wherein the sapogenin-affording seeds are from the genera Trigonella, Trifolium or Balanites and from the families of Leguminosae, Balanitaceae or Zygophyllacea.

5. The improvement according to claim 1 wherein said seeds and embryos are incubated at a temperature of from 5° C. to 80° C. prior to said extraction, with an aqueous medium, in an amount between the amount of aqueous medium which is absorbed by the seed and an excess of water sufficient to provide for a separate aqueous phase remaining at the end of the incubation period.

6. The improvement according to claim 5 wherein minerals are added to the aqueous medium, during said incubation.

7. The improvement according to claim 4 wherein the seed is fenugreek and the amount of aqueous medium varies between 5 and 20 parts per part of seed, and the sapogenin-affording material is present in the aqueous medium.

8. The improvement according to claim 1 wherein befor extraction, said seeds and embryos are subjected to acidic hydrolytic conditions to break the glycosidic link of said saponins.

9. The improvement according to claim 8 wherein *Trigonella foenum-graecum* seeds are incubated at 5° C. to 80° C. for a period of up to seven days, the incubated product is heated with hydrochloric acid and diosgenin and yamogenin are recovered from said acid hydrolysate by extraction.

10. The improvement according to claim 4 in which said seed is derived from *Trigonella foenum-graecum*.

11. A process for the extraction of diosgenin from seeds of *Trigonella foenum-graecum* which comprises incubating the uncomminuted seeds at a temperature of from 5° C. to 40° C. for up to seven days in the presence of added water, treating the incubated product with a diluted hydrochloric acid and extracting the acid free acid-insoluble residue with an organic solvent to provide a solution of diosgenin.

References Cited

UNITED STATES PATENTS

| | | | |
|---|---|---|---|
| 2,780,620 | 2/1957 | Krider et al. | 260—210.5 |
| 3,019,220 | 1/1962 | Julian | 260—239.55 |

ELBERT L. ROBERTS, *Primary Examiner.*